United States Patent
Tsubaki et al.

(10) Patent No.: US 9,789,901 B2
(45) Date of Patent: Oct. 17, 2017

(54) ELECTRIC POWER STEERING APPARATUS (71) Applicant: NSK Ltd., Tokyo (JP)

(72) Inventors: Takahiro Tsubaki, Maebashi (JP); Atsushi Oshima, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/125,791

(22) PCT Filed: Sep. 3, 2015

(86) PCT No.: PCT/JP2015/075035
§ 371 (c)(1),
(2) Date: Sep. 13, 2016

(87) PCT Pub. No.: WO2016/072143
PCT Pub. Date: May 12, 2016

(65) Prior Publication Data
US 2017/0232997 A1 Aug. 17, 2017

(30) Foreign Application Priority Data
Nov. 7, 2014 (JP) .................................. 2014-227313

(51) Int. Cl.
B62D 5/04 (2006.01)
B62D 15/02 (2006.01)

(52) U.S. Cl.
CPC ......... B62D 5/0463 (2013.01); B62D 5/0409 (2013.01); B62D 15/0215 (2013.01)

(58) Field of Classification Search
None
See application file for complete search history.

(56) References Cited

U.S. PATENT DOCUMENTS 6,278,922 B1 * 8/2001 Nishiwaki ................ B62D 1/28
180/197
6,915,194 B2 * 7/2005 Kodama .............. B62D 5/0487
180/422
(Continued)

FOREIGN PATENT DOCUMENTS

JP 2009-298338 A 12/2009
JP 2010-58598 A 3/2010
(Continued)

OTHER PUBLICATIONS

International Search Report of PCT/JP2015/075035, dated Nov. 2, 2015. [PCT/ISA/210].

Primary Examiner — Shelley Chen
(74) Attorney, Agent, or Firm — Sughrue Mion, PLLC (57) ABSTRACT

[Problem]
An object of the present invention is to provide an electric power steering apparatus that achieves desired steering feeling by controlling a column angle to follow a value corresponding to a steering angle and vehicle information, and that is not affected by variations in manufacturing, changes due to aging or the like of a vehicle and a steering system.

[Means for Solving the Problem]
An electric power steering apparatus that calculates a current command value based on at least a steering torque, and assists and controls a steering system by driving a motor based on the current command value, comprises a target column angle calculating section that calculates a target column angle based on a steering angle and vehicle information, and a column angle control section that calculates the current command value based on the target column angle and a detected actual column angle; and performs angle (Continued)

control of making a column angle a value corresponding to the steering angle and the vehicle information.

16 Claims, 8 Drawing Sheets

(56) References Cited

U.S. PATENT DOCUMENTS

| | | | | |
|---|---|---|---|---|
| 2003/0102181 | A1* | 6/2003 | Tokumoto | B62D 5/0457 180/446 |
| 2004/0133323 | A1* | 7/2004 | Kodama | B62D 5/0487 701/41 |
| 2005/0016791 | A1* | 1/2005 | Fukushima | B62D 6/008 180/446 |
| 2009/0105907 | A1* | 4/2009 | Yamaguchi | B62D 5/008 701/41 |
| 2010/0070137 | A1* | 3/2010 | Yamaguchi | B62D 5/008 701/41 |
| 2011/0036660 | A1* | 2/2011 | Kojo | B62D 5/008 180/446 |
| 2013/0304327 | A1* | 11/2013 | Morishita | B62D 5/0463 701/43 |
| 2015/0191200 | A1* | 7/2015 | Tsubaki | B62D 15/0285 701/42 |

FOREIGN PATENT DOCUMENTS

| | | |
|---|---|---|
| JP | 2013-23002 A | 2/2013 |
| JP | 5208894 B2 | 6/2013 |

* cited by examiner

FIG.1

PRIOR ART

FIG.2

PRIOR ART

FIG.10C

ELECTRIC POWER STEERING APPARATUS

CROSS REFERENCE TO RELATED APPLICATIONS

This application is a National Stage of International Application No. PCT/JP2015/075035 filed Sep. 3, 2015, claiming priority based on Japanese Patent Application No. 2014-227313, filed Nov. 7, 2014, the contents of all of which are incorporated herein by reference in their entirety.

TECHNICAL FIELD

The present invention relates to an electric power steering apparatus that provides a steering system of a vehicle with a steering assist torque by means of a motor, and in particular to an electric power steering apparatus that enables implementation of a desired steering torque corresponding to a steering angle and vehicle information without an influence of variations in manufacturing, changes due to aging or the like of the vehicle and the steering system.

BACKGROUND ART

An electric power steering apparatus (EPS) which assists and controls a steering system of a vehicle by means of a rotational torque of a motor, applies a driving force of the motor as a steering assist torque to a steering shaft or a rack shaft by means of a transmission mechanism such as gears or a belt through a reduction mechanism. In order to accurately generate a torque of assist control, such a conventional electric power steering apparatus performs feedback control of a motor current. The feedback control adjusts a voltage supplied to the motor so that a difference between a steering assist command value (a current command value) and a detected motor current value becomes small, and the adjustment of the voltage supplied to the motor is generally performed by an adjustment of duty command values of pulse width modulation (PWM) control.

Figure 1:
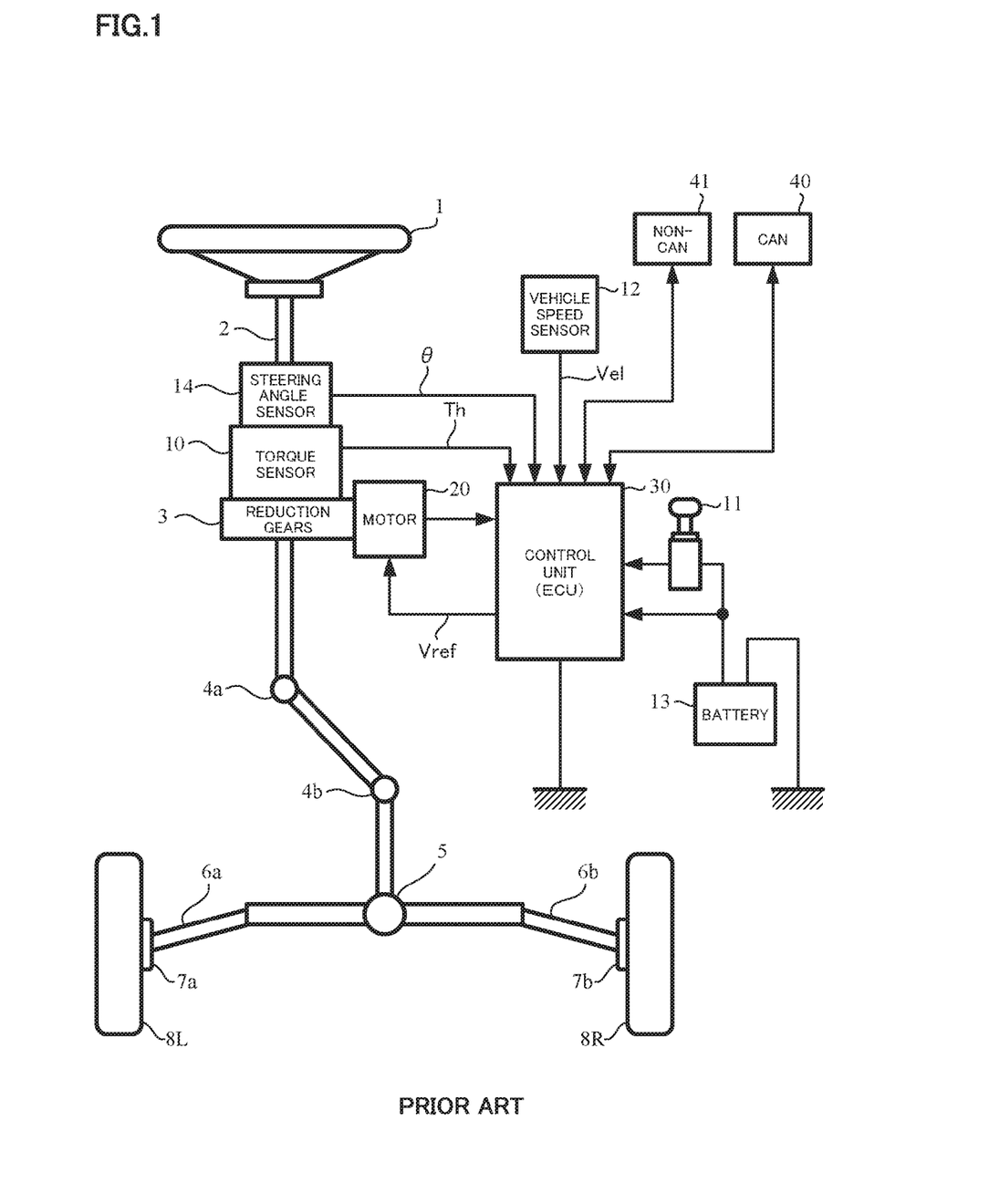
FIG. 1 is a configuration diagram illustrating a general outline of an electric power steering apparatus.

A general configuration of the conventional electric power steering apparatus will be described with reference to FIG. 1. As shown in FIG. 1, a column shaft (a steering shaft or a handle shaft) 2 connected to a steering wheel 1 is connected to steered wheels 8L and 8R through reduction gears 3, universal joints 4a and 4b, a rack-and-pinion mechanism 5, and tie rods 6a and 6b, further via hub units 7a and 7b. In addition, the column shaft 2 is provided with a torque sensor 10 for detecting a steering torque of the steering wheel 1 as a twist torque of a torsion bar, and a motor 20 for assisting a steering force of the steering wheel 1 is connected to the column shaft 2 through the reduction gears 3. The electric power is supplied to a control unit (ECU) 30 for controlling the electric power steering apparatus from a battery 13, and an ignition key signal is inputted into the control unit 30 through an ignition key 11. The control unit 30 calculates a current command value of an assist command on the basis of a steering torque Th detected by the torque sensor 10 and a vehicle speed Vel detected by a vehicle speed sensor 12, and controls a current supplied to the motor 20 by means of a voltage control value Vref obtained by performing compensation or the like to the calculated current command value. A steering angle sensor 14 for detecting a steering angle is not essential, it does not need to be provided, and it is possible to obtain the steering angle from a rotation sensor such as a resolver connected to the motor 20.

A controller area network (CAN) 40 exchanging various information of a vehicle is connected to the control unit 30, and it is possible to receive the vehicle speed Vel from the CAN 40. Further, it is also possible to connect a non-CAN 41 exchanging a communication, analog/digital signals, a radio wave or the like except with the CAN 40 to the control unit 30.

Figure 2:
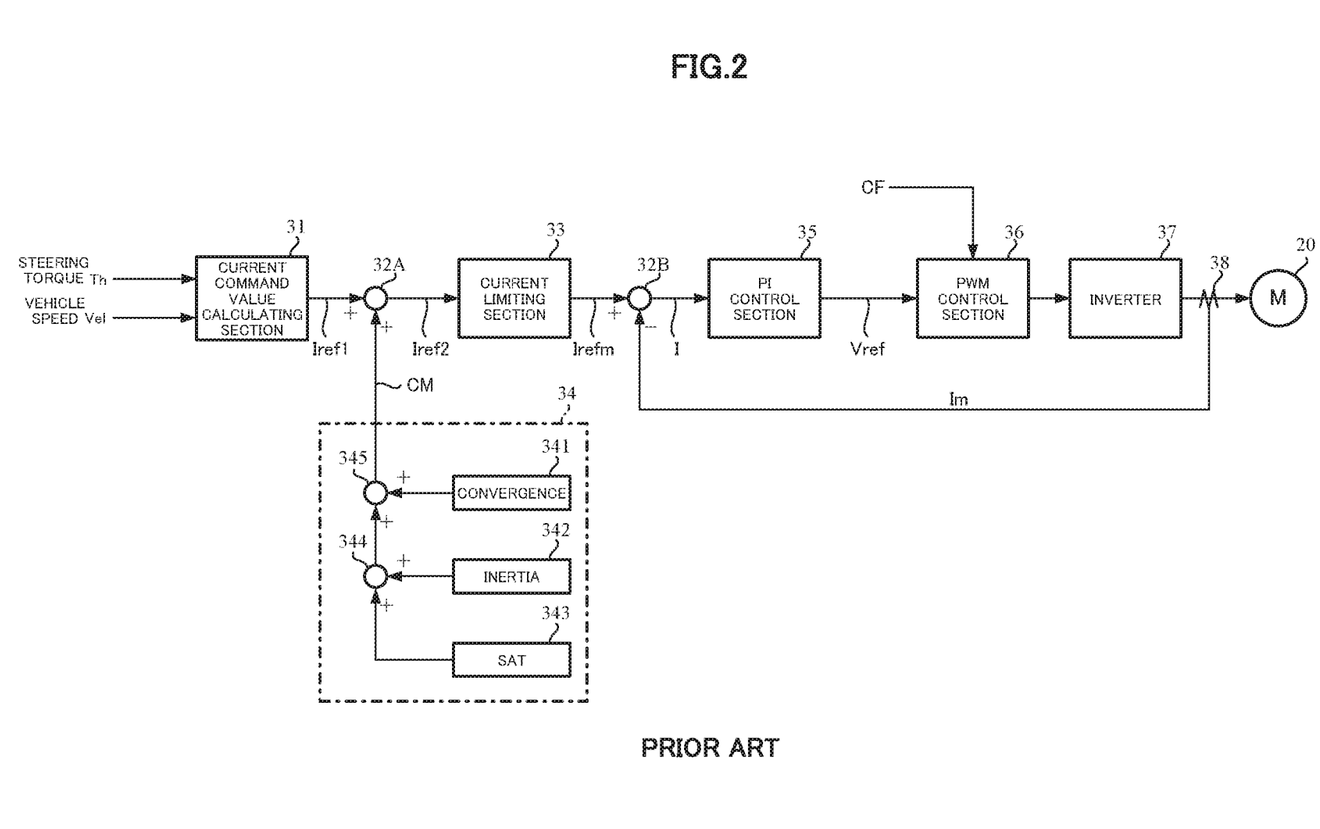
FIG. 2 is a block diagram showing a configuration example of a control system of the electric power steering apparatus.

In such an electric power steering apparatus, the control unit 30 mainly comprises a CPU (including an MPU and an MCU), and general functions performed by programs within the CPU are, for example, shown in FIG. 2.

Functions and operations of the control unit 30 will be described with reference to FIG. 2. As shown in FIG. 2, the steering torque Th from the torque sensor 10 and the vehicle speed Vel from the vehicle speed sensor 12 are inputted into a current command value calculating section 31. The current command value calculating section 31 calculates a current command value Iref1 on the basis of the steering torque Th and the vehicle speed Vel and by using an assist map or the like. The calculated current command value Iref1 is added in an adding section 32A to a compensation signal CM from a compensating section 34 for improving a characteristic. A current limiting section 33 limits a maximum value of the current command value Iref2 to which the compensation signal CM has been added. The current command value Irefm of which the maximum value has been limited is inputted into a subtracting section 32B, where a detected motor current value Im is subtracted from the current command value Irefm.

Proportional integral (PI) control to a deviation I (=Irefm−Im) which is the result of subtraction in the subtracting section 32B is performed in a PI control section 35. The voltage control value Vref obtained by the PI control is inputted into a PWM control section 36, which calculates duty command values in synchronization with a carrier signal CF, and PWM-drives the motor 20 through an inverter circuit 37 by means of a PWM signal. The motor current value Im of the motor 20 is detected by a motor current detector 38, and is inputted and fed back to the subtracting section 32B.

The compensating section 34 adds a detected or estimated self-aligning torque (SAT) 343 to an inertia compensation value 342 in an adding section 344, further, adds a convergence control value 341 to the result of addition in an adding section 345, and outputs the result of addition performed in the adding section 345 as the compensation signal CM to the adding section 32A so as to improve a characteristic of the current command value.

Thus, the conventional electric power steering apparatus performing assist control detects the steering torque that a driver manually adds as a twist torque of the torsion bar by means of the torque sensor, and sets the current command value for the assist control in feed-forward manner mainly depending on the steering torque. As a result, it is difficult to maintain the same level of steering performance because of variations in manufacturing of a vehicle and a steering system, changes of the vehicle and the steering system due to aging, or the like.

Such a vehicle control apparatus solving the above problem as disclosed in the publication of Japanese Patent No. 5208894 B2 (Patent Document 1) is proposed. The vehicle control apparatus disclosed in Patent Document 1 includes a steering angle detecting means to detect a steering angle of a steering generated by a driver steering; a target setting means to set a steering torque corresponding to the detected steering angle as a target value on the basis of the predetermined relation between the steering angle or the steering torque and a response amount, the relation being that the driver's response amount based on sensitivity of a ratio at which the steering torque is changed with respect to the change of the steering angle and sensitivity of the steering torque is constant in a range where the steering angle or the steering torque is smaller than a predetermined value, and the response amount monotonically increases as the steering angle or the steering torque increases in a range where the steering angle or the steering torque is larger than or equal to the predetermined value when the driver steers the steering from a neutral state of the steering without switching the steering direction; and a control means to perform control so as to achieve the target value of the steering torque set by the target setting means.

THE LIST OF PRIOR ART DOCUMENTS

Patent Documents

Patent Document 1: Japanese Patent No. 5208894 B2

SUMMARY OF THE INVENTION

Problems to be Solved by the Invention

The apparatus described in Patent Document 1 achieves the target value of the steering torque by obtaining a deviation between the target value of the steering torque (the twist angle) and the detected steering torque (the detected twist angle), and performing proportional integral (PI) control to the deviation. As a result, followability to the target steering torque is affected because friction quantity of the motor and the steering mechanism changes by variations in manufacturing, changes due to aging or the like of the vehicle and the steering system.

The present invention has been developed in view of the above-described circumstances, and the object of the present invention is to provide an electric power steering apparatus that achieves desired steering feeling by controlling a column angle to follow a value corresponding to a steering angle and vehicle information (such as a vehicle speed, a yaw rate, and a lateral acceleration (a lateral-G)), and that is not affected by variations in manufacturing, changes due to aging or the like of a vehicle and a steering system.

Means for Solving the Problems

The present invention relates to an electric power steering apparatus that calculates a current command value based on at least a steering angle, and assists and controls a steering system by driving a motor based on the current command value, the above-described object of the present invention is achieved by that comprising: a target column angle calculating section that calculates a target column angle based on the steering angle and vehicle information; and a column angle control section that calculates the current command value based on the target column angle and a detected actual column angle; wherein the column angle control section comprises a target column angular velocity calculating section that calculates a target column angular velocity based on a difference between the target column angle and the actual column angle, a differentiating section that calculates an actual column angular velocity based on the actual column angle, and a velocity control section that calculates the current command value based on the target column angular velocity and the actual column angular velocity; wherein the velocity control section comprises a third subtracting section that obtains a velocity difference between the target column angular velocity and the actual column angular velocity, an integrating section that multiplies what is obtained by integrating the velocity difference by an integral gain, a proportional control section that multiplies the actual column angular velocity by a proportional gain, and a fourth subtracting section that obtains the current command value by subtracting an output of the proportional control section from an output of the integrating section; and wherein the electric power steering apparatus performs angle control of making a column angle a value corresponding to the steering angle and the vehicle information. Further, the above-described object of the present invention is more effectively achieved by that comprising: a target column angle calculating section that calculates a target column angle based on the steering angle and vehicle information; and a column angle control section that calculates the current command value based on the target column angle and a detected actual column angle; wherein the column angle control section comprises a target column angular velocity calculating section that calculates a target column angular velocity based on a difference between the target column angle and the actual column angle, a differentiating section that calculates an actual column angular velocity based on the actual column angle, and a velocity control section that calculates the current command value based on the target column angular velocity and the actual column angular velocity; wherein the target column angular velocity calculating section comprises a second subtracting section that obtains an angle difference between the target column angle and the actual column angle, and a position control section that calculates the target column angular velocity by multiplying the angle difference by a proportional constant; wherein the velocity control section comprises a third subtracting section that obtains a velocity difference between the target column angular velocity and the actual column angular velocity, an integrating section that multiplies what is obtained by integrating the velocity difference by an integral gain, a proportional control section that multiplies the actual column angular velocity by a proportional gain, and a fourth subtracting section that obtains the current command value by subtracting an output of the proportional control section from an output of the integrating section; and wherein the electric power steering apparatus performs angle control of making a column angle a value corresponding to the steering angle and the vehicle information.

Further, the above-described object of the present invention is achieved by that comprising: a target column angle calculating section that calculates a target column angle based on the steering angle and vehicle information; and a column angle control section that calculates the current command value based on the target column angle and a detected actual column angle; wherein the column angle control section comprises a target column angular velocity calculating section that calculates a target column angular velocity based on a difference between the target column angle and the actual column angle, a differentiating section that calculates an actual column angular velocity based on the actual column angle, a velocity feed-forward control section that performs velocity feed-forward control of the target column angle, an adding section obtains a final target column angular velocity by adding a velocity feed-forward control value from the velocity feed-forward control section to the target column angular velocity, and a velocity control section that calculates the current command value based on the final target column angular velocity and the actual column angular velocity; and wherein the electric power steering apparatus performs angle control of making a column angle a value corresponding to the steering angle and the vehicle information. Moreover, the above-described object of the present invention is more effectively achieved by that wherein the vehicle information includes at least a vehicle speed, a yaw rate, and a lateral acceleration; or wherein the target column angle calculating section comprises a steering torque setting section that sets a desired steering torque depending on the steering angle, a dividing section that calculates a target twist angle by dividing the desired steering torque by a spring constant of a torsion bar, and a first subtracting section that subtracts the target twist angle from the steering angle; or wherein a limiter that outputs the current command value by limiting upper and lower limit values of the output from the velocity control section is added.

Effects of the Invention

The electric power steering apparatus of the present invention achieves the desired steering torque by controlling the column angle to follow the value corresponding to the steering angle and the vehicle information (such as the vehicle speed, the yaw rate, and the lateral acceleration). Further, the apparatus can maintain the same level of steering performance without being affected by variations in manufacturing, changes due to aging or the like of the vehicle and the steering system because of controlling the angle according to the deviation between the target column angle for achieving the desired steering torque and the detected actual column angle.

MODE FOR CARRYING OUT THE INVENTION

An electric power steering apparatus of the present invention comprises a target column angle calculating section that calculates a target column angle on the basis of a steering angle and vehicle information in order to achieve a desired steering torque corresponding to the steering angle and the vehicle information without being affected by variations in manufacturing, changes due to aging or the like of a vehicle and a steering system, and a column angle control section that calculates a current command value on the basis of the target column angle and a detected actual column angle, and performs angle control of making a column angle a value corresponding to the steering angle and the vehicle information.

Thereby, it is possible to maintain the same level of steering performance without being affected by variations in manufacturing, changes due to aging or the like of the vehicle and the steering system.

Hereinafter, an embodiment of the present invention will be described with reference to the accompanying drawings.

Figure 3:
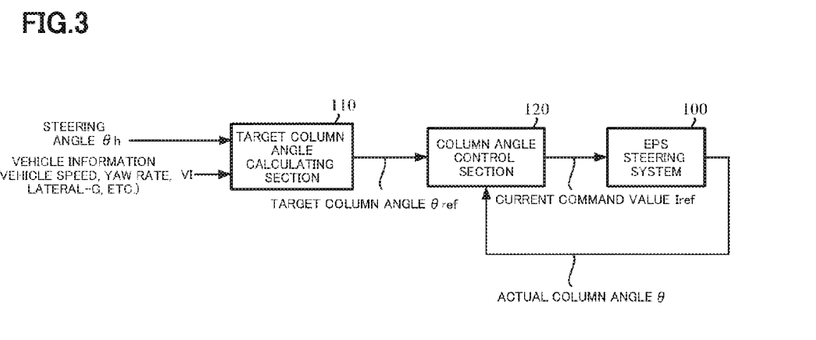
FIG. 3 is a block diagram showing a configuration example of the present invention.

FIG. 3 shows an embodiment example of the present invention. A steering angle eh being a steering wheel angle at the steering wheel side of a torsion bar is inputted into a target column angle calculating section 110. Vehicle information VI such as a vehicle speed, a yaw rate, and a lateral acceleration is also inputted into the target column angle calculating section 110. A target column angle θref calculated in the target column angle calculating section 110 is inputted into a column angle control section 120, which drives and controls an EPS steering system 100 by means of a current command value Iref calculated in the column angle control section 120. The column angle control section 120 calculates the current command value Iref so that a column angle follows the target column angle θref. Further, the EPS steering system 100 is provided with a sensor that detects the column angle being an angle at the column side of the torsion bar, and a detected actual column angle θ has been inputted into the column angle control section 120.

Figure 4:
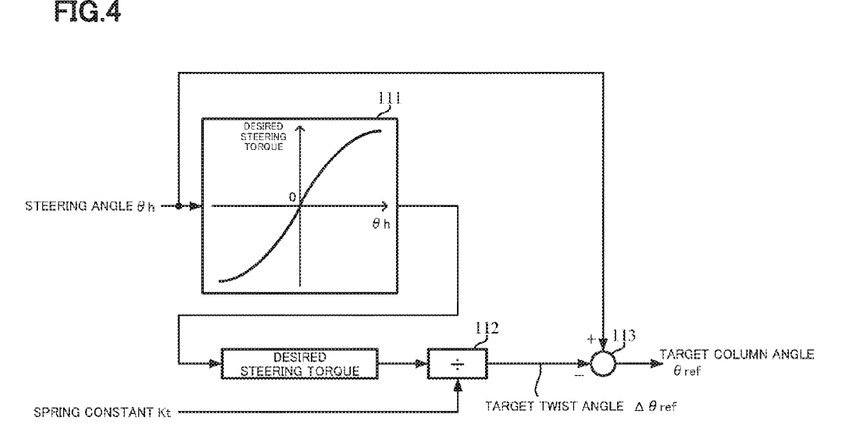
FIG. 4 is a block diagram showing a configuration example of a target column angle calculating section.

The target column angle calculating section 110 is configured, for example, as shown in FIG. 4. That is, the steering angle θh is inputted into a steering torque setting section 111 and a subtracting section 113, and the steering torque setting section 111 outputs a desired steering torque corresponding to the steering angle θh on the basis of a predetermined function. The desired steering torque is divided in a dividing section 112 by a spring constant Kt of the torsion bar, and a target twist angle Δθref being the result of division is subtraction-inputted into the subtracting section 113. The target twist angle Δθref is subtracted from the steering angle θh in the subtracting section 113, and the target column angle θref (=θh−Δθref) being the result of subtraction is outputted.

The target column angle θref that is calculated in the target column angle calculating section 110 in this way is inputted into the column angle control section 120. The actual column angle θ has been also inputted into the column angle control section 120.

Figure 5:
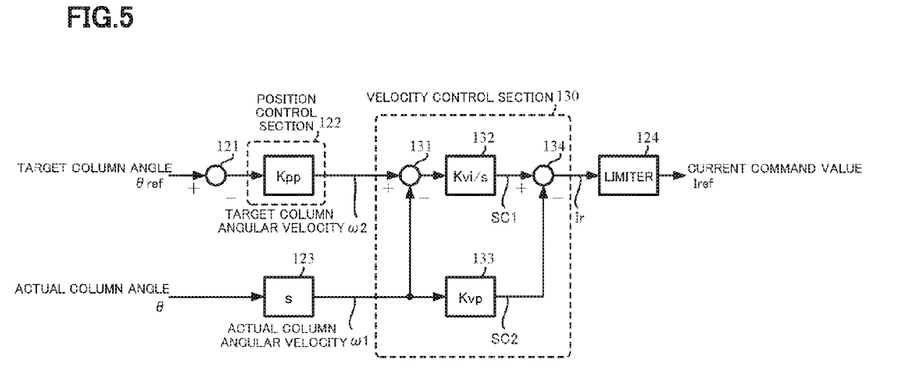
FIG. 5 is a block diagram showing a configuration example of a column angle control section.

The column angle control section 120 is configured, for example, as shown in FIG. 5. That is, the target column angle θref is addition-inputted into a subtracting section 121. The actual column angle θ is subtraction-inputted into the subtracting section 121, and is inputted into a differentiating section 123 performing time differential. An angle difference (=θref−θ) calculated in the subtracting section 121 is inputted into a position control section 122, and is multiplied by a proportional constant Kpp, so that a target column angular velocity ω2 is calculated. A target column angular velocity calculating section comprises the subtracting section 121 and the position control section 122.

The target column angular velocity ω2 is addition-inputted into a subtracting section 131 in a velocity control section 130 performing I-P control. Further, an actual column angular velocity ω1 calculated in the differentiating section 123 is subtraction-inputted into the subtracting section 131 in the velocity control section 130, and is inputted into a proportional control section 133. The result of subtraction (=ω2−ω1) in the subtracting section 131 is inputted into an integrating section 132, is integrated, and is multiplied by an integral gain Kvi, so that an integral result SC1 is addition-inputted into a subtracting section 134. Further, a result SC2 of proportional control in the proportional control section 133 is subtraction-inputted into the subtracting section 134. Upper and lower limit values of a current command value Ir (=SC1−SC2) being the result of subtraction in the subtracting section 134 are limited in a limiter 124, and the current command value Iref is outputted. The velocity control section 130 calculates the current command value Ir so that the actual column angular velocity ω1 follows the target column angular velocity ω2.

Figure 6:
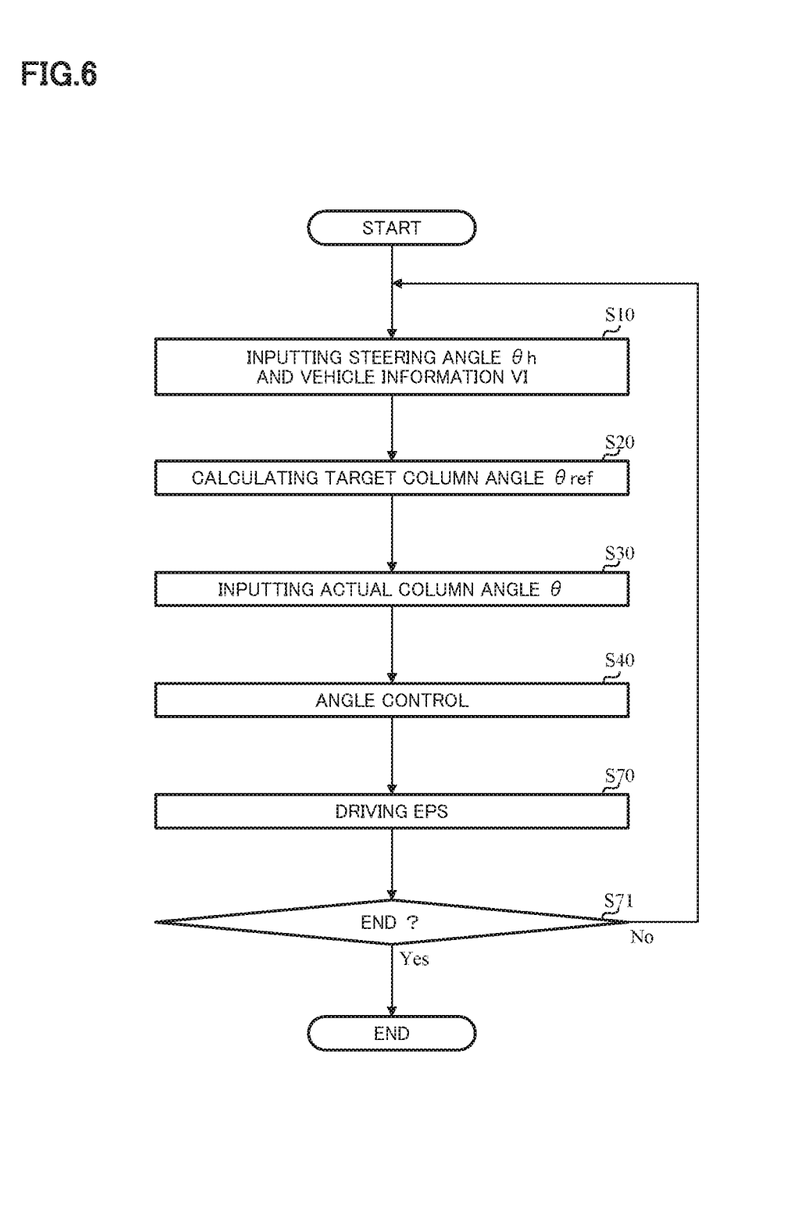
FIG. 6 is a flowchart showing a whole operating example of the present invention.

A whole operation example of such a configuration will be described with reference to a flowchart shown in FIG. 6.

First, the target column angle calculating section 110 inputs the steering angle θh and the vehicle information VI (Step S10), and calculates the target column angle θref (Step S20). The target column angle θref is inputted into the column angle control section 120, and the actual column angle θ from the EPS steering system 100 is also inputted into the column angle control section 120 (Step S30). The column angle control section 120 performs angle control on the basis of the target column angle θref and the actual column angle θ (Step S40), and drives and controls the EPS steering system 100 by the calculated current command value Iref (Step S70). The apparatus repeats the above operations until the end (Step S71).

Figure 7:
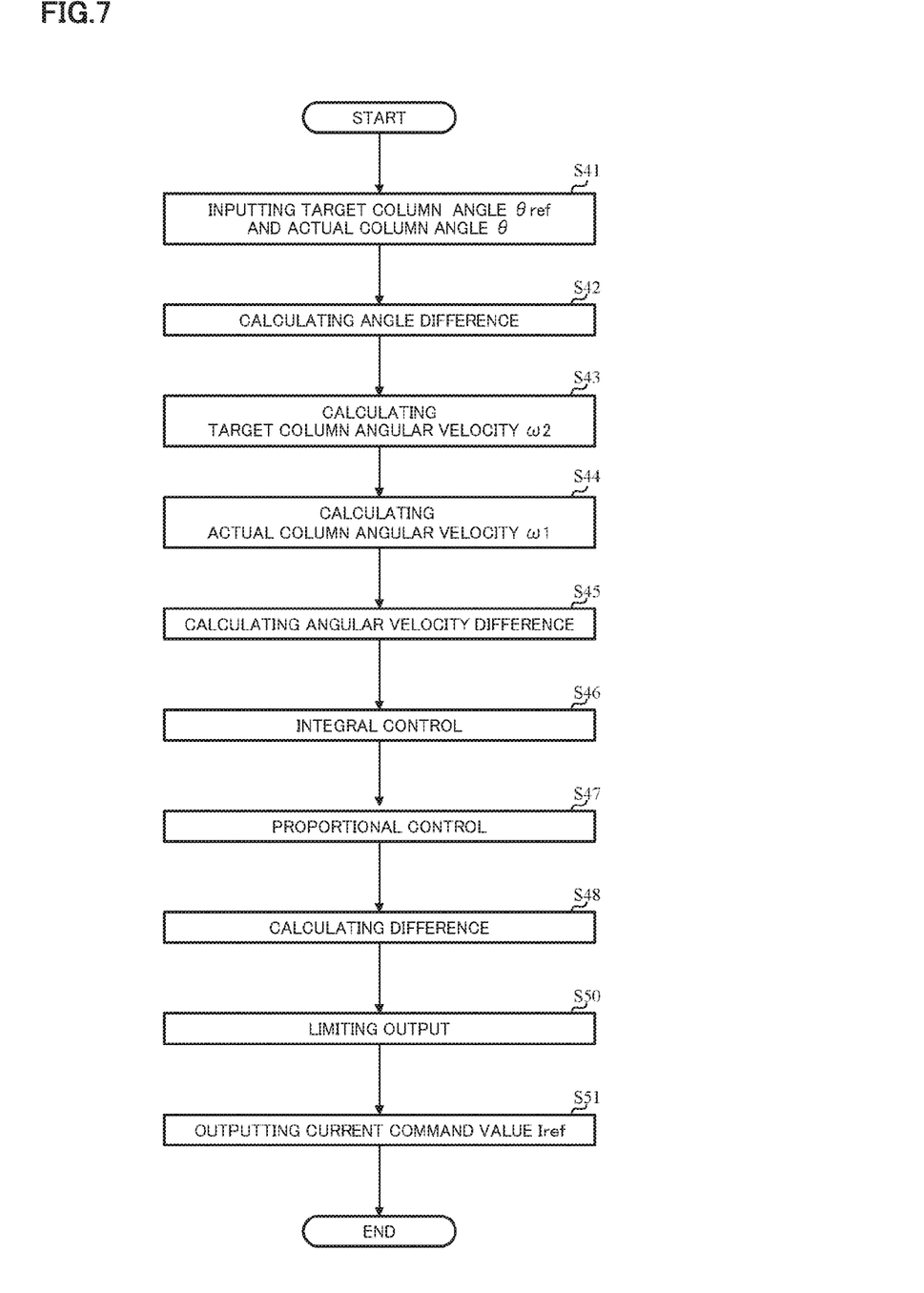
FIG. 7 is a flowchart showing an operating example of the column angle control section.

FIG. 7 shows an operating example of the column angle control section 120. First, the target column angle θref and the actual column angle 6 are inputted (Step S41). The angle difference (=θref−θ) is calculated in the subtracting section 121, is inputted into the position control section 122, and the actual column angle θ is moreover inputted into the differentiating section 123 (Step S42). The target column angular velocity ω2 is calculated on the basis of the angle difference in the position control section 122 (Step S43), and the actual column angular velocity ω1 is calculated by time differential in the differentiating section 123 (Step S44).

The target column angular velocity ω2 and the actual column angular velocity ω1 are inputted into the subtracting section 131, and the angular velocity difference (=ω2−ω1) is calculated (Step S45). The calculated angular velocity difference is inputted into the integrating section 132, which performs integral control (Step S46). The actual column angular velocity ω1 is inputted into the proportional control section 133, which performs proportional control (Step S47). The integral result SC1 and the result SC2 of proportional control are inputted into the subtracting section 134, and the difference (=SC1−SC2) is calculated (Step S48). The difference is outputted as the current command value Ir, the upper and lower limit values of it are limited in the limiter 124 (Step S50), and the current command value Iref is outputted (Step S51).

Figure 8:
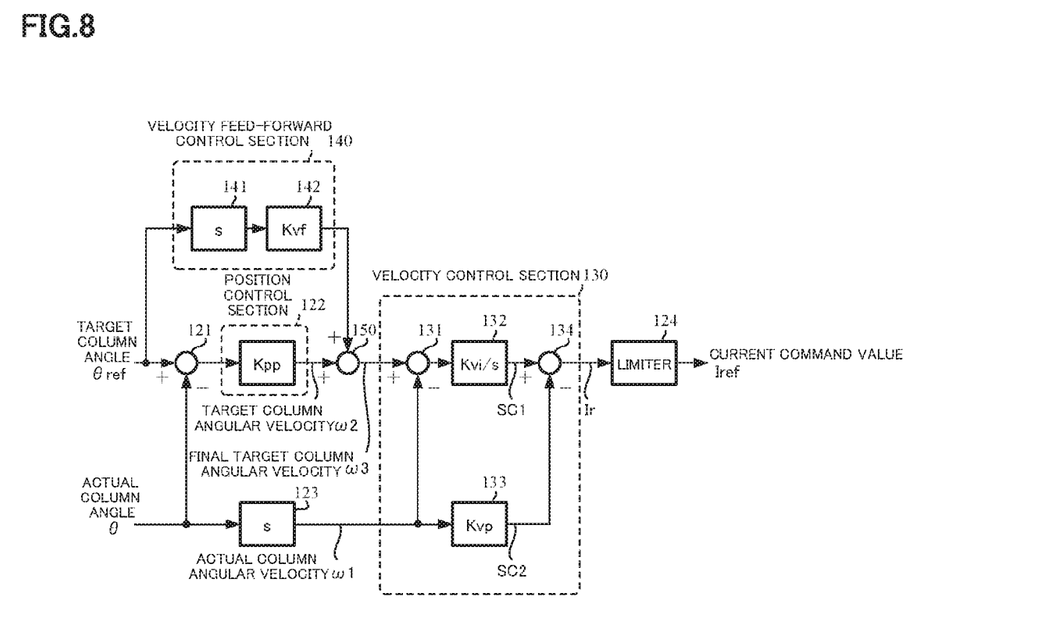
FIG. 8 is a block diagram showing another configuration example of the column angle control section.

FIG. 8 shows another configuration example of the column angle control section 120, which is provided with a velocity feed-forward control section 140 that multiplies a differential value of the target column angle θref by a gain Kvf and adds the result to the target column angular velocity ω2. The column angle control section 120 makes a final target column angular velocity ω3 of the value that the target column angular velocity ω2 has been added to, and inputs the final target column angular velocity ω3 into the velocity control section 130. This velocity feed-forward control section 140 improves followability (readiness) of the column angle θ to the target column angle θref.

Figure 9A:
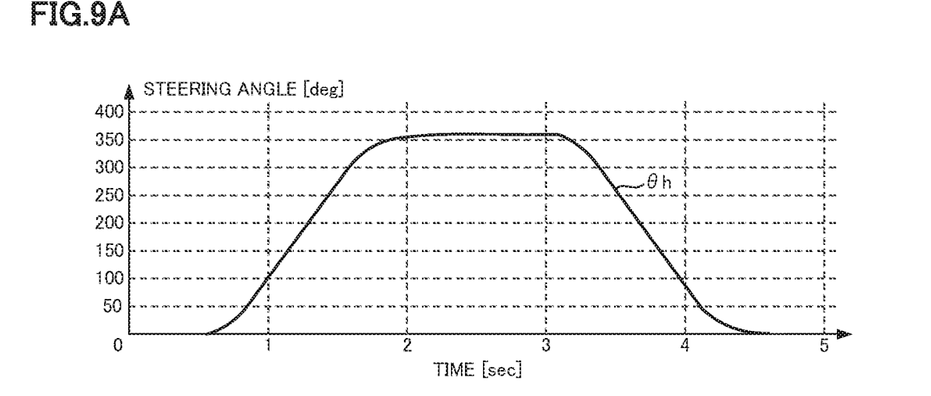
FIGS. 9A, 9B and 9C are characteristic diagrams describing an effect of the present invention.
Figure 9B:
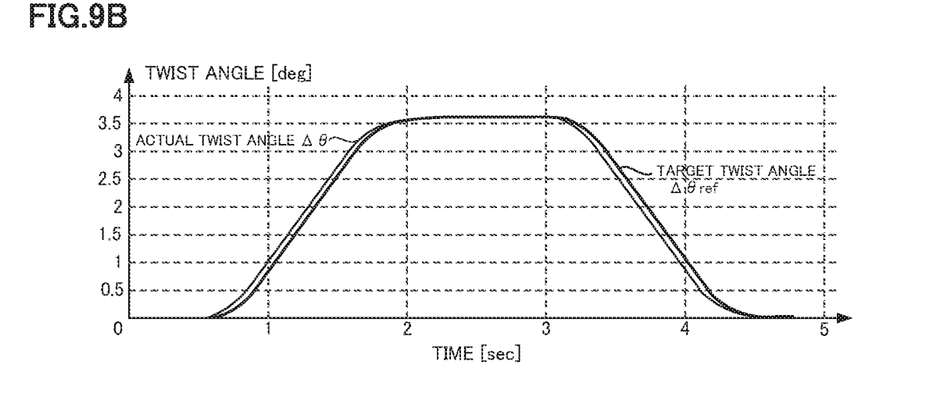
Figure 9C:
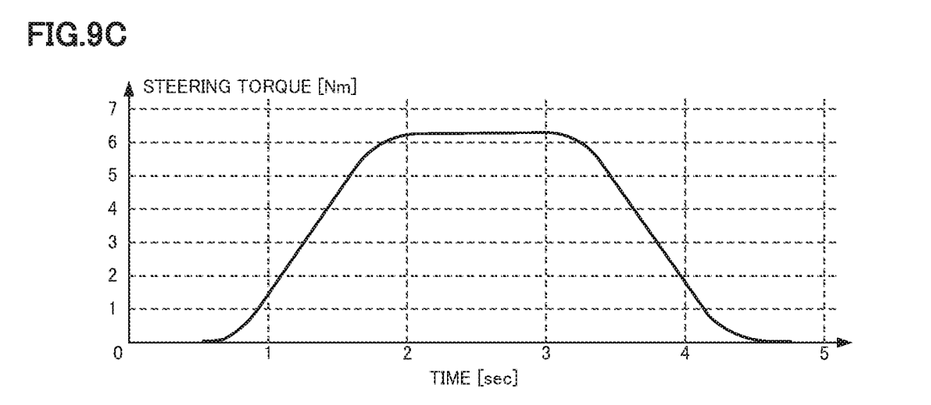

For example, an embodiment 1 outputs the target column angle θref that generates the desired steering torque corresponding to the steering angle θh from a target column angle table, and calculates the current command value for making the column angle θ follow the target column angle θref by angle control. When the steering angle θh changes as shown in FIG. 9A, the target column angle θref for achieving the desired steering torque is calculated, and the column angle θ follows this. As a result, an actual twist angle Δθ changes as shown by a thin line with respect to the desired twist angle Δθref (shown by a thick line) in FIG. 9B. The difference between the desired twist angle Δθref (shown by the thick line) and the actual twist angle Δθ (shown by the thin line) is very small, and both of them are the same in the range where the steering angle θh is stable in FIG. 9B. As a result, a steering torque occurring as hand feeling becomes as shown in FIG. 9C (where the desired steering torque is omitted).

Figure 10A:
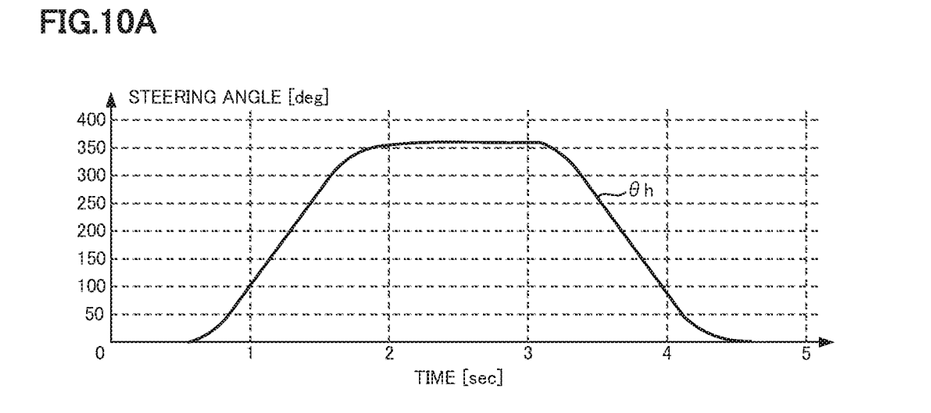
FIGS. 10A, 10B and 10C are characteristic diagrams describing an effect of the present invention.
Figure 10B:
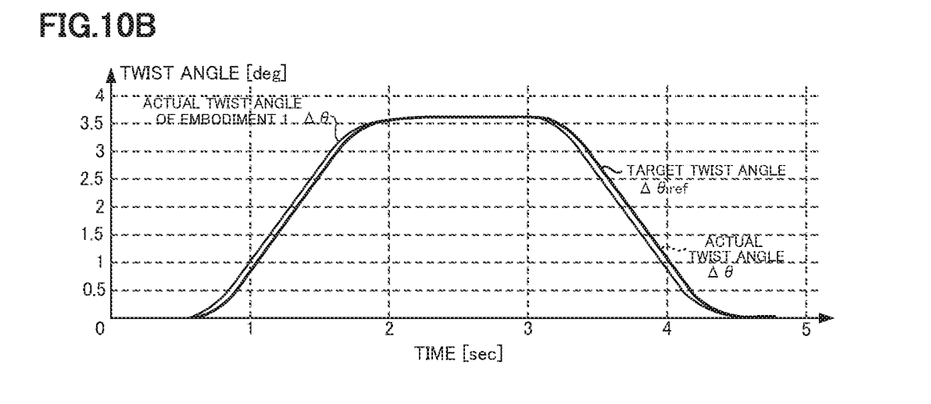
Figure 10C:
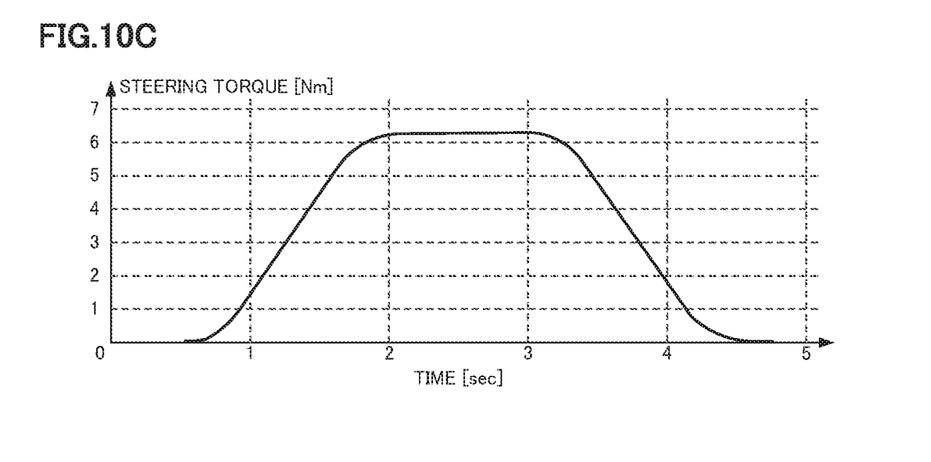

Further, it is possible to obtain the final target column angular velocity ω3 by adding the value which is obtained by multiplying a value equivalent to the differential value of the target column angle θref by the gain to the target column angular velocity ω2 shown in the above-described embodiment 1 (these operations is velocity feed-forward control) in order to improve followability to the target column angle θref. FIGS. 10A, 10B and 10C show a simulation result of this embodiment 2. FIG. 10A shows a change of the steering angle θh. From FIG. 10B, it is found out that the actual twist angle Δθ of the embodiment 2 (shown by a broken line) follows the desired twist angle Δθref (shown by a thick line) more accurately than one of the embodiment 1 (shown by a thin line) with respect to the desired twist angle Δθref. The thick line showing the desired twist angle Δθref and the broken line showing the actual twist angle Δθ almost overlap, further, the desired twist angle Δθref (shown by the thick line), the actual twist angle Δθ of the embodiment 1 (shown by the thin line) and the desired twist angle Δθref of the embodiment 2 (shown by a broken line) are the same in the range where the steering angle eh is stable in FIG. 10B. The steering torque occurring as hand feeling becomes as shown in FIG. 10C.

Moreover, it is possible to add a current command value that is calculated by an estimated SAT value and works for restraint to the current command value for angle control in order to restrain an influence by SAT disturbance. Further, the velocity control section can use not only the above-described I-P control, but also, for example, PI control, P control, PID control, or PI-D control.

Furthermore, it is possible to calculate the column angle by subtracting a twist angle of a torsion bar (used for detecting a torque) from a steering angle (a steering wheel angle), that is, "the column angle=the steering angle−the twist angle" when there is no angle sensor for detecting the column angle.

EXPLANATION OF REFERENCE NUMERALS 1 steering wheel
2 column shaft (steering shaft, handle shaft)
10 torque sensor
12 vehicle speed sensor
13 battery
20 motor
100 EPS steering system
110 target column angle calculating section
111 steering torque setting section
120 column angle control section
122 position control section
123 differentiating section
124 limiter 130 velocity control section
140 velocity feed-forward control section

The invention claimed is:

1. An electric power steering apparatus that calculates a current command value based on at least a steering angle, and assists and controls a steering system by driving a motor based on said current command value, comprising:
a target column angle calculating section that calculates a target column angle based on said steering angle and vehicle information; and
a column angle control section that calculates said current command value based on said target column angle and a detected actual column angle;
wherein said column angle control section comprises a target column angular velocity calculating section that calculates a target column angular velocity based on a difference between said target column angle and said actual column angle, a differentiating section that calculates an actual column angular velocity based on said actual column angle, and a velocity control section that calculates said current command value based on said target column angular velocity and said actual column angular velocity;
wherein said velocity control section comprises a third subtracting section that obtains a velocity difference between said target column angular velocity and said actual column angular velocity, an integrating section that multiplies what is obtained by integrating said velocity difference by an integral gain, a proportional control section that multiplies said actual column angular velocity by a proportional gain, and a fourth subtracting section that obtains said current command value by subtracting an output of said proportional control section from an output of said integrating section; and
wherein said electric power steering apparatus performs angle control of making a column angle a value corresponding to said steering angle and said vehicle information.

2. An electric power steering apparatus that calculates a current command value based on at least a steering angle, and assists and controls a steering system by driving a motor based on said current command value, comprising:
a target column angle calculating section that calculates a target column angle based on said steering angle and vehicle information; and
a column angle control section that calculates said current command value based on said target column angle and a detected actual column angle;
wherein said column angle control section comprises a target column angular velocity calculating section that calculates a target column angular velocity based on a difference between said target column angle and said actual column angle, a differentiating section that calculates an actual column angular velocity based on said actual column angle, and a velocity control section that calculates said current command value based on said target column angular velocity and said actual column angular velocity;
wherein said target column angular velocity calculating section comprises a second subtracting section that obtains an angle difference between said target column angle and said actual column angle, and a position control section that calculates said target column angular velocity by multiplying said angle difference by a proportional constant;
wherein said velocity control section comprises a third subtracting section that obtains a velocity difference between said target column angular velocity and said actual column angular velocity, an integrating section that multiplies what is obtained by integrating said velocity difference by an integral gain, a proportional control section that multiplies said actual column angular velocity by a proportional gain, and a fourth subtracting section that obtains said current command value by subtracting an output of said proportional control section from an output of said integrating section; and
wherein said electric power steering apparatus performs angle control of making a column angle a value corresponding to said steering angle and said vehicle information.

3. The electric power steering apparatus according to claim 1, wherein
said vehicle information includes at least a vehicle speed, a yaw rate, and a lateral acceleration.

4. The electric power steering apparatus according to claim 2, wherein
said vehicle information includes at least a vehicle speed, a yaw rate, and a lateral acceleration.

5. The electric power steering apparatus according to claim 1, wherein
a limiter that outputs said current command value by limiting upper and lower limit values of the output from said velocity control section is added.

6. The electric power steering apparatus according to claim 2, wherein
a limiter that outputs said current command value by limiting upper and lower limit values of the output from said velocity control section is added.

7. The electric power steering apparatus according to claim 3, wherein
a limiter that outputs said current command value by limiting upper and lower limit values of the output from said velocity control section is added.

8. The electric power steering apparatus according to claim 4, wherein
a limiter that outputs said current command value by limiting upper and lower limit values of the output from said velocity control section is added.

9. An electric power steering apparatus that calculates a current command value based on at least a steering angle, and assists and controls a steering system by driving a motor based on said current command value, comprising:
a target column angle calculating section that calculates a target column angle based on said steering angle and vehicle information; and
a column angle control section that calculates said current command value based on said target column angle and a detected actual column angle;
wherein said column angle control section comprises a target column angular velocity calculating section that calculates a target column angular velocity based on a difference between said target column angle and said actual column angle, a differentiating section that calculates an actual column angular velocity based on said actual column angle, a velocity feed-forward control section that performs velocity feed-forward control of said target column angle, an adding section obtains a final target column angular velocity by adding a velocity feed-forward control value from said velocity feed-forward control section to said target column angular velocity, and a velocity control section that calculates said current command value based on said final target column angular velocity and said actual column angular velocity; and wherein said electric power steering apparatus performs angle control of making a column angle a value corresponding to said steering angle and said vehicle information.

10. The electric power steering apparatus according to claim 9, wherein
said vehicle information includes at least a vehicle speed, a yaw rate, and a lateral acceleration.

11. The electric power steering apparatus according to claim 9, wherein
said target column angle calculating section comprises a steering torque setting section that sets a desired steering torque depending on said steering angle, a dividing section that calculates a target twist angle by dividing said desired steering torque by a spring constant of a torsion bar, and a first subtracting section that subtracts said target twist angle from said steering angle.

12. The electric power steering apparatus according to claim 10, wherein
said target column angle calculating section comprises a steering torque setting section that sets a desired steering torque depending on said steering angle, a dividing section that calculates a target twist angle by dividing said desired steering torque by a spring constant of a torsion bar, and a first subtracting section that subtracts said target twist angle from said steering angle.

13. The electric power steering apparatus according to claim 9, wherein
a limiter that outputs said current command value by limiting upper and lower limit values of the output from said velocity control section is added.

14. The electric power steering apparatus according to claim 10, wherein
a limiter that outputs said current command value by limiting upper and lower limit values of the output from said velocity control section is added.

15. The electric power steering apparatus according to claim 11, wherein
a limiter that outputs said current command value by limiting upper and lower limit values of the output from said velocity control section is added.

16. The electric power steering apparatus according to claim 12, wherein
a limiter that outputs said current command value by limiting upper and lower limit values of the output from said velocity control section is added.

* * * * *